United States Patent [19]
Roman et al.

[11] Patent Number: 5,665,807
[45] Date of Patent: Sep. 9, 1997

[54] COMPOSITE MATERIALS RESISTANT TO WEAR AND A PROCESS FOR THEIR MANUFACTURE

[75] Inventors: Jean-Marie Roman, Echirolles; Gérard Bienvenu; Jürgen Gauger, both of Annemasse, all of France

[73] Assignee: GEC Alsthom Neyrpic, Grenoble, France

[21] Appl. No.: 570,336

[22] Filed: Dec. 11, 1995

Related U.S. Application Data

[62] Division of Ser. No. 980,210, Nov. 23, 1992, Pat. No. 5,527,849.

[30] Foreign Application Priority Data

Nov. 21, 1991 [FR] France ................... 91-14608

[51] Int. Cl.$^6$ .................... C08K 3/14; C08K 7/04
[52] U.S. Cl. ................. 524/404; 524/414; 524/430; 524/443; 523/220; 523/223
[58] Field of Search .................... 524/404, 414, 524/443, 430; 523/220, 223

[56] References Cited

U.S. PATENT DOCUMENTS

| | | | |
|---|---|---|---|
| 3,876,608 | 4/1975 | Anderson et al. | 523/218 |
| 3,954,694 | 5/1976 | Hallstrom et al. | 260/37 |
| 5,145,900 | 9/1992 | Sterzel et al. | 524/404 |

OTHER PUBLICATIONS

Chemical Abstracts, vol. 85, No. 20, Nov. 15, 1976, abstract No. 114923.
World Patents Index Latest, JP–A–2 262 346, Oct. 25, 1990.
World Patents Index Latest, JP–A–62 154 230, Jul. 9, 1987.

*Primary Examiner*—Paul R. Michl
*Assistant Examiner*—Olga Asinovsky
*Attorney, Agent, or Firm*—Burns, Doane, Swecker & Mathis, L.L.P.

[57] ABSTRACT

The subject composite materials comprise an association of an organic elastic matrix with a network of non-oxidized quasi spherical particles, of submicronic dimension and of a diameter ranging between 0.1 µm and 10 µm, distributed uniformly in the matrix.

The materials are intended to coat pieces subjected to the phenomena of wear, erosion, cavitation and abrasion notably in a corrosive medium.

According to a method of manufacture of these composite materials, the nonoxidized submicronic particles are, immediately before their introduction in the organic matrix, plunged into an organic macromolecular dispersant chosen of such type that the macromolecular chains of the dispersant are fixed on the surface of the particles by noncovalent bonds.

10 Claims, No Drawings

COMPOSITE MATERIALS RESISTANT TO WEAR AND A PROCESS FOR THEIR MANUFACTURE

This application is a divisional, of application Ser. No. 07/980,210, filed Nov. 23,1992 U.S. Pat. No. 5,527,849.

BACKGROUND OF THE INVENTION

The present invention relates to materials resistant to wear as well as to a process for their manufacture.

A number of technological areas have been searched in order to resolve the problems posed by wear, erosion, cavitation and abrasion in corrosive media. These problems are especially important for blades of hydraulic turbines.

Persons in the art have generally sought a material combining the following properties:

Increased hardness which permits the material to resist the phenomena of erosion and friction;

Good ductility so as to permit it to resist shocks;

A structure which assures good behavior against corrosion.

Currently, the materials employed, including steels having high mechanical characteristics and ceramics, do not possess all of the above properties which appear to some extent to be mutually exclusive.

Thus, a material having the requisite durability is not generally very ductile. If the material is highly resistant to corrosion, it often does not have adequate mechanical properties. The principal problem in the materials which are available today lies in their fragility.

SUMMARY AND OBJECTS OF THE INVENTION

In view of the foregoing limitations and shortcomings of the prior art, as well as other disadvantages not specifically mentioned above, it should be apparent that there still exists a need in the art for composite materials, easily applied to materials which are in current usage, which provide, at the same time, the characteristics of hardness, ductility and an adapatable structure.

Over the course of numerous experiments, the inventors were able to determine that the best results were obtained by associating an organic polymeric matrix (of elastomeric type, sufficiently elastic to absorb shocks from large suspended particles in a flowing fluid) with a sufficiently dense network of hard submicronic particles having a nearly spherical shape and a regular distribution. The hard particles are distributed in this organic polymeric matrix such that, when a particle (for example of some tens of microns by the finest measurement) comes to strike the composite material of the invention, it is received in a dense bed of hard particles encased in the elastic matrix.

The introduction of large particles in organic matrices is already well known and used in the field of soft embankments for reinforcing such materials against wear caused by walking or motor vehicle traffic on their surface. The materials of this type have been found to be completely unsuitable when they are subjected to the phenomenon of erosion because of the action of fluids having abrasive particles therein; in this case, in fact, it has been observed, under the action of these fluids, that the large particles are dislodged from the matrix.

The present invention therefore relates to, in a first aspect, composite materials comprised of an admixture of an organic elastic matrix with a network of non-oxidized and quasi spherical ceramic particles, of submicronic dimension for the most part and having in general a diameter between 0.1 and 10 µm, distributed uniformly in such matrix.

In a second aspect, the present invention relates to a process for the manufacture of composite materials as described above comprising the steps of (i) plunging the submicronic particles, immediately before their introduction into the organic matrix, into a macromolecular organic dispersant having macromolecular chains fixed on the surface of the particles by non-covalent bonds and (ii) introducing the submicronic particles into the organic matrix.

With the foregoing as well as other objects, advantages, and features of the invention that will become hereinafter apparent, the nature of the invention may be more readily understood by reference to the following detailed description of the preferred embodiments and to the appended claims.

DETAILED DESCRIPTION OF PREFERRED EMBODIMENTS

The elastic organic matrix can be chosen from among polyurethane compounds.

Alternatively, the organic elastic matrix can be chosen from among the synthetic elastomer such as butadiene and butyl rubber.

The submicronic parties of ceramic non-oxidized powders are chosen from among the carbides, nitrides and carbonitrides of refractory metals such as titanium, zirconium, hafnium, tantalum, niobium, tungsten, molybdenum, boron and silicon or a mixture of such metals.

According to a preferred embodiment, the submicronic particles are chosen from among the non-oxidized ceramic powders formed between a metalloid and a refractory metal, such as those obtained by the preferred embodiment in the process described in French Patent A-87 0097 of Jan. 8, 1987. One of the principal advantages of this process is that it enables one to obtain, superficially, a stoichiometric composition within 4% and a surface is poor in oxygen.

The density of the submicronic particles is greater than that of the particles susceptible of causing degradation of the coated material.

They can range between about 16 and about 5, as in the case for example of the particles of WC (d=5.72); TaC (14.48); NbC (7.78); TaN (14.3).

For reasons of economy and of optimization of the absorption of shock, there are preferably chosen submicronic particles having a density of about 5.

An important characteristics of the composite materials according to the invention is that there does not exist any electrochemical coupling between the matrix and the submicronic particles, a coupling which would be susceptible of interfering in the eventual corrosion process.

The composite materials according to the invention can be applied on substrates of any nature, such as metal alloys, organic compounds, concrete, wood, glass and all other composite materials.

The invention also relates to a process for obtaining these composite materials, which enables one to obtain such a perfect distribution of hard submicronic particles in the interior of the matrix as well as the absence of all electrochemical couplings between the matrix and the particles, avoiding in this way all intervention in the eventual process of corrosion.

According to this process, the uniform and homogeneous distribution, without agglomeration, of submicronic ceramic non-oxidized particles in the matrix is assured by the fact that said submicronic particles are, immediately before their introduction into the matrix, plunged in an organic macromolecular dispersant chosen such that the macromolecular chains of the dispersant are fixed on the surface of the particles by non-covalent bonds. In this way, the interfacial tension between the organic matrix and the submicronic particles is reduced; on the other hand, the same macromolecular chains assure the maintenance of the distance separating the submicronic particles.

The submicronic particles are thus inserted in the dispersant and a stearic effect is produced by reason of the fact that the sites of the dispersant which are able to accommodate the particles are small in number; the particles will in this way be engulfed at significant distances, in a molecular scale, one from the other.

The dispersant is preferably chosen from among the polycarboxylic or polysilane compounds or a combination of these two compounds.

According to a preferred embodiment of the invention, the dispersant comprises a combination of a polycarboxylic acid and a polysiloxane copolymer.

The organic nature of the matrix and of the dispersant assures the polar compatibility of these two components, and permits them to form non-covalent bonds.

The percentage of the submicronic ceramic particles advantageously ranges between 1 and 80% by weight based on the final weight.

A process for the manufacture of the composite materials according to the invention essentially includes the following steps:

Preparation of the surface of non-oxidized submicronic ceramic powders for insertion, under an agitation less than or equal to 16,000 rpm, for about 10 to 30 minutes at a temperature less than 100° C., in an organic macromolecular dispersant.

Introduction, under agitation less or equal to 16,000 rpm and at a temperature less than 100° C., of ceramic powders prepared in this way in one of the components of the organic matrix.

Introduction of the mixture so obtained into the other component of the matrix and the immediate application of the combination on the piece prepared for receiving such material.

Alternatively, another process for the manufacture of the composite materials according to the invention includes essentially the following steps:

Preparation of the surface of ceramic non-oxidized submicronic particles for insertion, under agitation less than or equal to 16,000 rpm, for 10 to 30 minutes and at a temperature less than 100° C. in an organic macromolecular dispersant.

Introduction, under agitation less than or equal to 16,000 rpm and at a temperature less than 100° C. of ceramic powders so prepared in the organic matrix and the immediate application of the mixture on a piece prepared to receive such material.

The rapidity of these operations, or, in the absence thereof, agitation under heat, permits one to prevent the eventual phenomenon of the decanting of the particles in the organic matrix.

The process permits the obtaining, in a very simple fashion, of either solid materials or materials in lamellar layers having a good resistance to erosion.

In this manner, an elastic matrix of a density equal to 1.1 g/cm$^3$, filled with 30% by weight of spherical particles of average diameter of 0.7 μm with a density of 5.4 g/cm$^3$ has a superficial density of $5.85 \times 10^7$ particles per cm$^2$. The shock of a solid particle of 50 μm in diameter on such a surface is absorbed on a surface of about $2 \times 10^{-6}$ cm$^2$ containing 1150 receptive micro-particles.

It can thus be seen that the size of the particles inserted in the elastic matrix is adapted as much to have a sufficient number of particles subjected to the impact as to have specific and important surfaces of particle/matrix bonding, a good adhesion, a good density, and an increased hardness (greater than 2,000 HV (500 g)). On the other hand, the quasi spherical form of the submicronic particles is one which best resists the impact of large particles which come and strike the composite material.

The thicknesses of the materials obtained by the preferred embodiment of the process can be very important (less than or equal to several tens of centimeters) which permits at the time of the impact of the incident particles, the distribution and the dampening of the shock wave in the mass; in the case of lamellar layers, it will in this way be possible to avoid problems of substrate/product bonds.

The following examples of manufacture of the anti-abrasion composite materials and their application on steel cylinders will permit one to better understand the present invention, the characteristics which it has and the advantages which it enables one to obtain.

In the examples, the matrix is a polyurethane matrix but it should be apparent that one of ordinary skill in the art would easily be able to replace this matrix with other elastomeric matrices, in a notable case where it would be necessary to provide matrices having a higher resistance to elevated temperatures.

EXAMPLE 1

There was prepared a powder of titanium carbide for use as a reducing agent of calcium carbide prepared in situ in a bath of melted salt essentially comprising calcium chloride, under the conditions described in Example 1 of French Patent A-87 00097.

There is obtained a powder having an mesh of 4.3279 angstroms, with a variation of 0.257% and an avenge granulometry of 0.5 μm 69.6 g of isocyanate prepolymer (such as that commercially available under the name of DESMODUR VP-LS 2954 by Bayer), 20.0 g of this powder and 2.0 grams of an organic dispersant of a base of polycarboxylic acid-polysiloxane, such as that commercially available under the name BYK P 104 S by BYK-Chemie (Germany) are mixed with a rotation speed of less than or equal to 1,000 rpm, and then at a rotation speed less than or equal to 16,000 rpm, at a temperature on the order of 80° C., for 20 minutes.

The mixture thus obtained is added to 8.4 g of a hardener comprising a 67% solution of a carbonate of propylene of an aromatic substituted diamine.

There is prepared on the other hand steel/chrome cylinders of diameter of 20 mm and a height of 47 mm by cleaning in acetone, drying and treating one of the two surfaces treated with a 100 grain abrasive paper. The treated surfaces are cleaned in acetone and the cylinder dried at 40° C. There is applied by the stroke of a brush on the treated surface of the cylinder a layer on the order of 2 to 5 mm of a primary coating of epoxy resin which is dried:

either for 2 hours at 40° C.: Cylinder A or for 24 hours at 20° C.: Cylinder B

It is on these cylinders prepared in this manner that there is immediately applied the material prepared in accordance with Example 1.

EXAMPLE 2

One starts with the powder of titanium carbide prepared under the conditions of Example 1.

59.8 g of isocyanate prepolymer (such as that commercially available under the name DESMODUR VP-LS 2954 by Bayer), 30.0 g of this powder and 3.0 g of an organic dispersant having a polycarboxylic acid-polysiloxane base, such as that commercially available under the name of BYK P 104 S by BYK-Chemie (Germany) are mixed with an agitation speed less than or equal to 1,000 rpm, and then at a speed less than or equal to 16,000 rpm, at a temperature on the order of 80° C., for 20 minutes.

The mixture thus obtained, added to 7.2 g of a hardener comprising 67% solution of a carbonate of propylene of aromatic substituted diamine, is applied immediately on the steel cylinders prepared as described above (A and B).

EXAMPLE 3

One starts with a titanium carbide powder prepared under the conditions of Example 1.

50.0 g of isocyanate prepolymer (such as that commercially available under the name DESMODUR VP-LS 2954 by Bayer), 40.0 g of this powder and 4.0 g of an organic dispersant having a polycarboxylic acid-polysiloxane base, such as that commercially available under the name of BYK P 104 S by BYK-Chemie (Germany) are mixed with an agitation speed less than or equal to 1,000 rpm, and then at a speed less than or equal to 16,000 rpm, at a temperature on the order of 80° C., for 20 minutes.

The mixture thus obtained, added to 6 g of a hardener comprising a 67% solution of a substituted aromatic propylene diamine carbonate, is immediately applied on the steel cylinders prepared as mentioned above (A and B).

Besides, there is applied to a cylinder having a layer of primary epoxy coating which is dried for 2 hours at 40° C. and which is then coated by a mixture comprising 89.3 g of isocyanate prepolymer and the hardening agent utilized in the preceding examples.

The obtained results are as follows:

| WEAR IN MM FOR DIFFERENT MATERIALS AND UNDER IDENTICAL CONDITIONS OF ABRASIVE EROSION | |
|---|---|
| Pu alone | 0.50 |
| Pu + ceramic | 0.20 |
| Steel charge inox austenitic 304 or 316 | 0.9 |
| Steel charge inox martenestique Z 05 CN 16-04 | 0.85 |
| Abrasive steel of type CREUSABRO (Creusot-Loire) | 0.7 |
| Construction steel | 1.2 |

Similar results have been obtained by replacing the titanium carbide by titanium nitride or silicon carbide Although only preferred embodiments of the invention are specifically described above, it will be appreciated that many modifications and variations of the present invention are possible in light of the above teachings and within the purview of the appended claims without departing from the spirit and intended scope of the invention.

What is claimed is:

1. Composite materials resistant to wear and intended for covering pieces subjected to the phenomena of wear, erosion, cavitation and abrasion especially in a corrosive media, comprising a mixture of (i) an organic matrix which is an elastomeric polymer which is sufficiently elastic to absorb shocks from large suspended particles in a flowing fluid;

(ii) a network of quasi spherical non-oxidized ceramic particles, substantially of submicronic dimension and having in general a diameter ranging between 0.1 μm and 10 μm, distributed uniformly in said matrix, said, quasi-spherical particles imparting resistance to impact of large particles which strike said material; and (iii) a macromolecular dispersant capable of reducing interfacial tension between said elastic organic matrix and said quasi spherical non-oxidized ceramic particles.

2. Composite materials according to claim 1 wherein the density of said submicronic particles ranges between about 16 and about 5 g/cm$^2$.

3. Composite materials according to claim 1, wherein said organic elastic matrix is a polyurethane.

4. Composite materials according to claim 1, wherein said organic elastic matrix is a elastomeric organic compound resistant to temperatures greater than 100° C.

5. Composite materials according to claim 1, wherein said submicronic particles are powders of carbides, nitrides or carbonitrides of refractory metals chosen from the group consisting of titanium, zirconium, hafnium, tantalum, niobium, tungsten, molybdenum, boron and silicon or a mixture of these metal compounds.

6. Composite materials according to claim 4, wherein said submicronic particles are powders of carbides, nitrides or carbonitrides of a refractory metal.

7. Composite materials according to claim 6, wherein the density of the submicronic particles is about 5 g/cm$^3$.

8. A substrate coated with the composite of claim 1.

9. Composite materials resistant to wear and intended for covering pieces subjected to the phenomena of wear, erosion, cavitation and abrasion especially in a corrosive media, consisting essentially of a mixture of:

(i) an elastic organic matrix;

(ii) a network of quasi spherical non-oxidized ceramic particles, substantially of submicronic dimension and having in general a diameter ranging between 0.1 μm and 10 μm, distributed uniformly in said matrix, said quasi-spherical particles imparting resistance to impact of large particles which strike said material; and (iii) a macromolecular dispersant capable of reducing interfacial tension between said elastic organic matrix and said quasi spherical non-oxidized ceramic particles.

10. Composite materials resistant to wear and intended for covering pieces subjected to the phenomena of wear, erosion, cavitation and abrasion especially in a corrosive media, comprising a mixture of:

(i) an organic matrix which is an elastomeric polymer which is sufficiently elastic to absorb shocks from large suspended particles in a flowing fluid;

(ii) a network of quasi spherical non-oxidized ceramic particles, substantially of submicronic dimension and having in general a diameter ranging between 0.1 μm and 10 μm, distributed uniformly in said matrix, said quasi-spherical particles imparting resistance to impact of large particles which strike said material; and (iii) a macromolecular dispersant capable of reducing interfacial tension between said elastic organic matrix and said quasi-spherical non-oxidized ceramic particles, said composite material being in a final form for use in covering said pieces.

* * * * *